(12) United States Patent
Elliot

(10) Patent No.: US 7,818,903 B2
(45) Date of Patent: *Oct. 26, 2010

(54) VEHICLE FRONT-END QUICK CONNECT HITCH AND LIFT ASSEMBLY

(76) Inventor: Barry K. Elliot, H.C. 88, Box 31-A, Hudson, KY (US) 40145

(*) Notice: Subject to any disclaimer, the term of this patent is extended or adjusted under 35 U.S.C. 154(b) by 1066 days.

This patent is subject to a terminal disclaimer.

(21) Appl. No.: 11/490,480

(22) Filed: Jul. 20, 2006

(65) Prior Publication Data

US 2007/0272421 A1 Nov. 29, 2007

Related U.S. Application Data

(60) Provisional application No. 60/765,417, filed on Feb. 3, 2006.

(51) Int. Cl.
*E02F 3/04* (2006.01)
*E01H 5/04* (2006.01)

(52) U.S. Cl. ............................. 37/468; 172/445.1

(58) Field of Classification Search ............ 37/468, 37/231–234, 417; 172/445.1, 439, 272–275; 414/498, 608, 680, 685, 686, 697, 703, 722–725, 414/912; 280/186
See application file for complete search history.

(56) References Cited

U.S. PATENT DOCUMENTS

| 3,050,884 | A | 8/1962 | Takeda |
|---|---|---|---|
| 3,285,625 | A | 11/1966 | Krueger |
| 3,583,494 | A | 6/1971 | Thompson |
| 3,605,906 | A | 9/1971 | Coates |
| 3,643,976 | A | 2/1972 | Haupt et al. |
| 3,688,847 | A | 9/1972 | Deeter |
| 3,807,065 | A | 4/1974 | Billingsley |
| 3,853,335 | A | 12/1974 | Heckenkamp |
| 4,221,399 | A | 9/1980 | Berg |
| 4,279,084 | A | 7/1981 | Low et al. |
| 4,787,811 | A | 11/1988 | Langenfeld |
| 4,805,322 | A | 2/1989 | Lemire et al. |
| 4,907,357 | A | 3/1990 | Lilienthal |
| 4,962,598 | A | 10/1990 | Woolhiser et al. |
| 5,009,443 | A | 4/1991 | Howatt |
| 5,014,452 | A | 5/1991 | Berghefer |

(Continued)

FOREIGN PATENT DOCUMENTS

JP    57-137533    8/1982

*Primary Examiner*—Robert E Pezzuto
(74) *Attorney, Agent, or Firm*—Carrithers Law Office, PLLC; David W. Carrithers

(57) ABSTRACT

A hitch and adapter assembly for connecting an implement to the front end of vehicles such as all terrain vehicle providing a rigid connection with limited motion for reduced vibration operation. The hitch has two spaced apart sockets on a rigid frame that pivotally connects to the vehicle providing a rigid extension thereof. The sockets receive and cooperatively engage respective pins on the implement providing a quick connection. An electrically powered hydraulic cylinder is connected at one end to the frame and the other end connects to the vehicle by a coupler that slip fits into a socket therefore on the vehicle. The frame pivotally connects to the vehicle at two spaced apart positions. There is a coarse and fine adjustment for varying the height and tilt positions of the implement.

11 Claims, 19 Drawing Sheets

U.S. PATENT DOCUMENTS

| | | |
|---|---|---|
| 5,036,608 A | 8/1991 | Ciula |
| 5,064,338 A | 11/1991 | Lawrence |
| 5,329,708 A | 7/1994 | Segorski |
| 5,346,018 A | 9/1994 | Koster |
| 5,485,690 A | 1/1996 | MacQueen |
| 5,615,745 A | 4/1997 | Cross |
| 5,746,275 A | 5/1998 | Cross |
| 5,938,395 A | 8/1999 | Dumont, Jr. |
| 5,950,336 A | 9/1999 | Liebl |
| 5,967,241 A | 10/1999 | Cross et al. |
| 6,012,240 A | 1/2000 | Klug et al. |
| 6,257,347 B1 | 7/2001 | Campisi |
| 7,063,169 B2 | 6/2006 | Elliot |

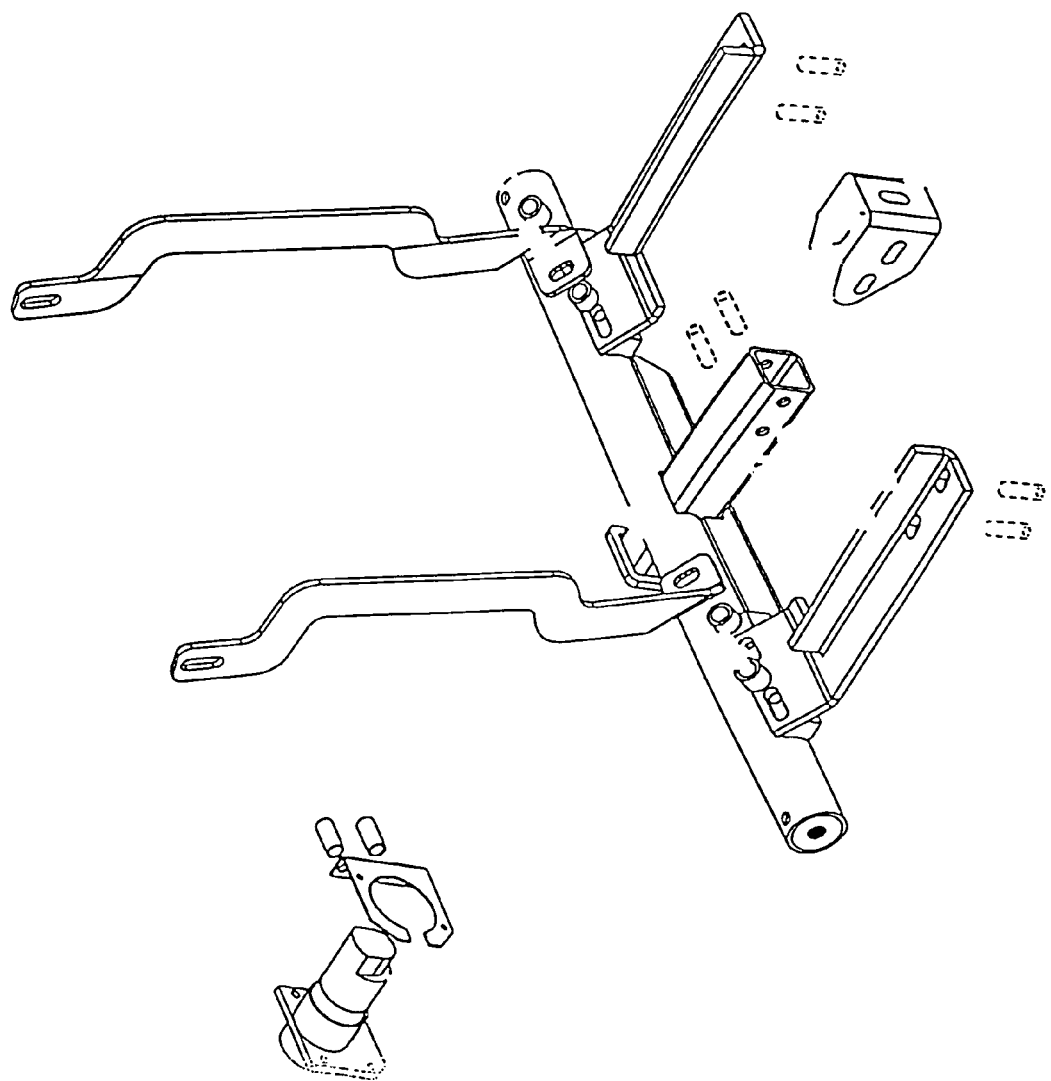

US 7,818,903 B2

VEHICLE FRONT-END QUICK CONNECT HITCH AND LIFT ASSEMBLY

RELATED APPLICATIONS

This application claims priority from PCT application Serial No. PCT/US04/01425 filed on Jan. 20, 2004 which claims priority from U.S. Pat. No. 7,063,169 which issued on Jun. 20, 2006 from application Ser. No. 10/645,307 filed on Aug. 21, 2003 and U.S. Provisional Application Ser. No. 60/765,417 filed on Feb. 3, 2006, all of which are incorporated herein in their entirety.

TECHNICAL FIELD

This invention relates generally to vehicle hitches and more particularly to a three point quick coupling hitch with an electrically controlled hydraulic lift and fine tuning adjustments for use on the front end of all terrain vehicles or the rigid frame of other vehicles.

BACKGROUND INFORMATION

All terrain vehicles are popular recreational vehicles but with appropriate implements attached thereto they can serve as work machines. For example with a blade or bucket attached they can clear snow from walks or driveways or level earth. With grass cutting attachments they can be used to keep large areas neatly trimmed. Implements useable for the instant quick coupling hitch include snow blowers, rotary tilling devices, rotary brushes, seeders, front end mounted trenchers, yard excavators, push blade, box scrapers, reel lawn mower, rotary lawn motor, saw bush cutting systems and boom mowers, post drivers, posthole augers, drawbars with specialty hitch attachments, vacuum systems, fork lifts, platforms, and the like. Changing from one implement to the other of a work vehicle and a recreational vehicle can be time consuming or of sufficient annoyance that one often will not bother changing for recreational purposes of short duration.

A number of patents are directed to frames for attaching implements to all terrain vehicles (ATV's), or garden tractors for manipulating the attached implement thus indicating a need and various solutions in an attempt to meet that need. U.S. Pat. No. 3,688,847 granted Sep. 5, 1972 to P. Deeter and U.S. Pat. No. 5,329,708 granted Jul. 19, 1994 to M. Segorski disclose implement mounting frames that extend under the frame of the vehicle. This reduces the clearance of the vehicle thus reducing its ability to pass over obstacles. U.S. Pat. No. 5,967,241 granted Oct. 19, 1999 to G. Gross and U.S. Pat. No. 5,615,745 granted Apr. 1, 1997 to G Cross disclose lift mechanisms for the attached implement. The lifts are manually operated and thereby have obvious limitations including requiring dexterity of the operator as well as difficulties in positioning and repositioning the implement. U.S. Pat. No. 5,950,336 granted Sep. 14, 1999 to K. Liebl addresses some of the concerns by providing a mounting frame with an electric lift. The frame is attached to the vehicle by two lever arms and a pin connection for each and is essentially permanently attached to the implement thus making difficult to substitute one implement for another.

U.S. Pat. No. 5,746,275 granted May 5, 1998 to G. Cross discloses a three point hitch that includes a plurality of pin connected links and an electric lift. The hitch attaches to the axle of the vehicle and therefore extends some distance from where the hitch attaches to the implement. The three point attachment is the connection of the hitch to the implement.

SUMMARY OF INVENTION

The hitch and lift assembly comprises a rigid, U-shape frame, a hydraulic jack unit, a coupler connecting one end of the hydraulic jack unit to a receiver on the ATV and an adjusting mechanism that connects the other end of the hydraulic jack unit to the U-shaped frame.

A preferred embodiment provides for a hitch and lift assembly for attaching an implement to a motorized vehicle having a rigid frame with horizontal and/or vertical cross members typically utilized in the support of ATV, garden tractors and the like. The hitch and lift assembly includes a crossbar member as a rigid link selectively adjustably connected to the ATV frame members by "U-clamps" or other means of attachment. The hitch and lift assembly also includes a generally U-shaped frame comprising a pair of elongated tubular members or legs spaced apart, aligned and connected in the front by a cross member near the ends of the legs which are formed having the distal ends define a pair of spaced apart cylindrical sockets opposite the distal ends of the legs being pivotally attached to the ATV or other vehicle frame. A rigid link defining a floating lockable cam provides limited arcuate movement relative to the frame and includes means limiting the arcuate movement. The hitch and lift assembly also includes an electric powered extendible and retractable power driven jack unit connected at one end thereof to said rigid link defining the floating cam. Means for connecting the distal ends of the legs to the motorized vehicle consists of a pair of removable pins cooperatively engaging the implement or apparatus to be lifted.

Moreover, the hitch and adapter assembly for connecting an implement to the frame of the front end of vehicles such as all terrain vehicle provides a rigid connection with limited motion for reduced vibration operation. The hitch has two spaced apart sockets on a rigid frame that pivotally connects to the vehicle providing a rigid extension thereof. The sockets receive and cooperatively engage respective pins on the implement providing a quick connection. The electrically powered hydraulic cylinder is connected at one end to the frame and the other end connects to the vehicle by a coupler that slip fits into a socket therefore on the vehicle. The frame pivotally connects to the vehicle at two spaced apart positions. There is a coarse and fine adjustment for varying the height and tilt positions of the implement.

A principal object of the present invention is to provide a simple, robust adjustable front-end quick connect hitch and lift assembly for a vehicle such as a tractor or more particularly an all terrain vehicle, ("ATV").

A principal object of the present invention is to provide a hitch as above described that is usable to connect a variety of implements to the vehicle.

A further principal object of the present invention is to provide a three point hitch for an ATV with a quick connect/disconnect connection to the implement.

It is another object to provide a floating cam link which includes coarse adjustments, fine adjustments, and means for locking the floating cam into position in order to provide downward pressure via the electric hydraulic jack.

These and other objects of the present invention will be more fully understood from the following description of the invention.

One embodiment of the present invention provides for a hitch for attaching an implement to a motorized vehicle comprising: a rigid generally U-shaped frame comprising pair of a legs connecting to a cross member thereinbetween, a pair of spaced apart sockets on the frame at a location remote from a free outer end of each one of the legs of the U-shaped frame, the free outer end of each leg being pivotally attachable to the motorized vehicle; a crossbar member selectively adjustably connected to free outer end of each of the legs of the U-shaped frame, and means limiting arcuate movement of the U-shaped frame; an extendible and retractable power driven jack unit disposed within the U-shaped frame connecting at one end to the cross member and means for connecting the other end to the motorized vehicle; wherein the U-shaped frame comprises a pair of parallel conduits open at one end thereof and the cross member interconnecting the conduits adjacent the open ends, the open ends providing the sockets; and the ends of the conduits opposite the open ends have an apertured lug for pivotal attachment to the motorized vehicle.

Another embodiment of the present invention provides for a hitch for attaching an implement to a motorized vehicle comprising: a rigid generally U-shaped frame comprising pair of a legs connecting to a cross member therebetween, a pair of spaced apart sockets on the frame at a location remote from a free outer end of each one of the legs of the U-shaped frame, the free outer end of each leg being pivotally attachable to the motorized vehicle; a crossbar member selectively adjustably connected to free outer end of each of the legs of the U-shaped frame, and means limiting arcuate movement of the U-shaped frame; an extendible and retractable power driven jack unit disposed within the U-shaped frame connecting at one end to the cross member and means for connecting the other end to the motorized vehicle; and the rigid link is connected to a lug projecting from the rigid frame by a pivot pin and wherein the lug has a series of spaced apart apertures for receiving the pin and thereby being selectively adjustably connectable.

Another preferred embodiment defines a hitch for attaching an implement to a motorized vehicle comprising: a rigid generally U-shaped frame comprising pair of a legs connecting to a cross member therebetween, a pair of spaced apart sockets on the frame at a location remote from a free outer end of each one of the legs of the U-shaped frame, the free outer end of each leg being pivotally attachable to the motorized vehicle; a crossbar member selectively adjustably connected to free outer end of each of the legs of the U-shaped frame, and means limiting arcuate movement of the U-shaped frame; an extendible and retractable power driven jack unit disposed within the U-shaped frame connecting at one end to the cross member and means for connecting the other end to the motorized vehicle; and wherein there are a pair of the lugs spaced apart from one another and wherein the link projects between the lugs.

Yet another embodiment provides of a hitch for attaching an implement to a motorized vehicle comprising: a rigid generally U-shaped frame comprising pair of a legs connecting to a cross member therebetween, a pair of spaced apart sockets on the frame at a location remote from a free outer end of each one of the legs of the U-shaped frame, the free outer end of each leg being pivotally attachable to the motorized vehicle; a crossbar member selectively adjustably connected to free outer end of each of the legs of the U-shaped frame, and means limiting arcuate movement of the U-shaped frame; an extendible and retractable power driven jack unit disposed within the U-shaped frame connecting at one end to the cross member and means for connecting the other end to the motorized vehicle; wherein the means connecting the jack unit to the motorized vehicle comprises a coupler; and wherein the coupler is Z-shaped.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 19 is a perspective view of an alternate embodiment of a frame the present invention for mounting onto the ATV.

DESCRIPTION OF THE PREFERRED EMBODIMENTS

Figure 2:
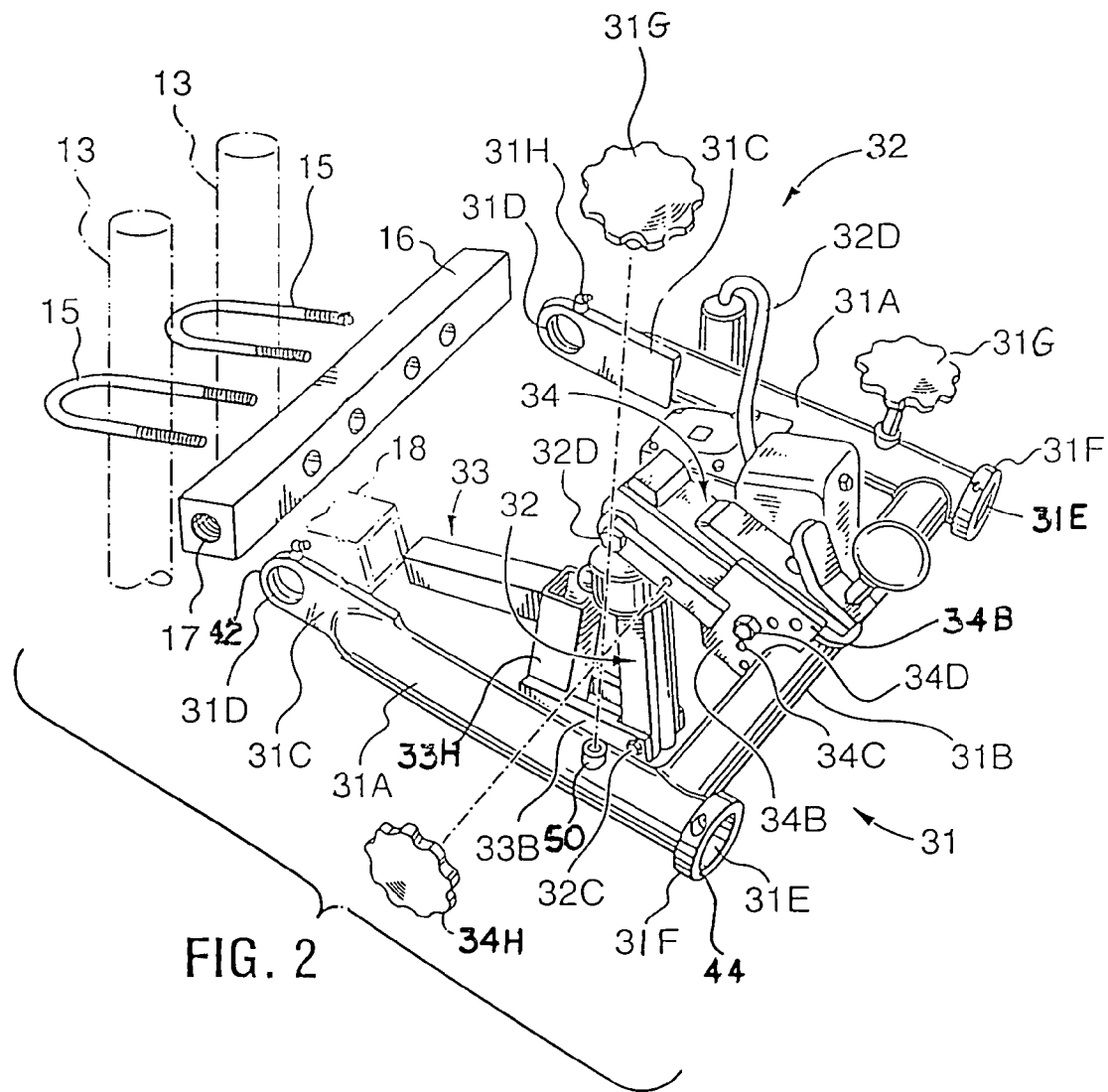
FIG. 2 is an exploded, oblique view of the hitch and lifting assembly shown in FIG. 1.

Referring to the drawings there is illustrated a conventional all terrain vehicle (ATV) 10 with a blade 20 attached to the front thereof by a hitch 30 provided in accordance with the present invention. The blade 20 maybe used to clear snow or move earth and is by way of example of an implement attachable to the vehicle. Of course, it is contemplated that any implement set forth heretofore could be substituted for the blade 20. The ATV has an open protective rigid grill 12 on the front comprising a weldment of a pair of generally vertical tubular members 13 as shown in FIG. 2 which is a typical arrangement for tubing members forming a part of the ATV frame. The grill 12 is part of the vehicle 10 and is rigidly attached to and forms a part of the vehicle frame. Means for holding such as a pair of "U" clamps 15 attach a horizontally disposed longitudinal crossbar member 16 to the two vertically disposed tubular frame members 13 that are part of the rigid grill 12. The crossbar member 16 has a means for pivotally detachable engagement defining a threaded hole 17 in opposing distal ends thereof, each one for receiving one of a pair of hitch mounting bolts 19 thereby pivotally connecting a frame portion of the hitch supported by the tubular frame members 13 to the vehicle 10.

The hitch and lift assembly 30 comprises a rigid, U-shape frame 31, a hydraulic jack unit 32, a coupler 33 connecting one end of the hydraulic jack unit 32 to a receiver 18 on the ATV and an adjusting mechanism 34 that connects the other end of the hydraulic jack unit 32 to the U-shaped frame 31.

Figure 5:
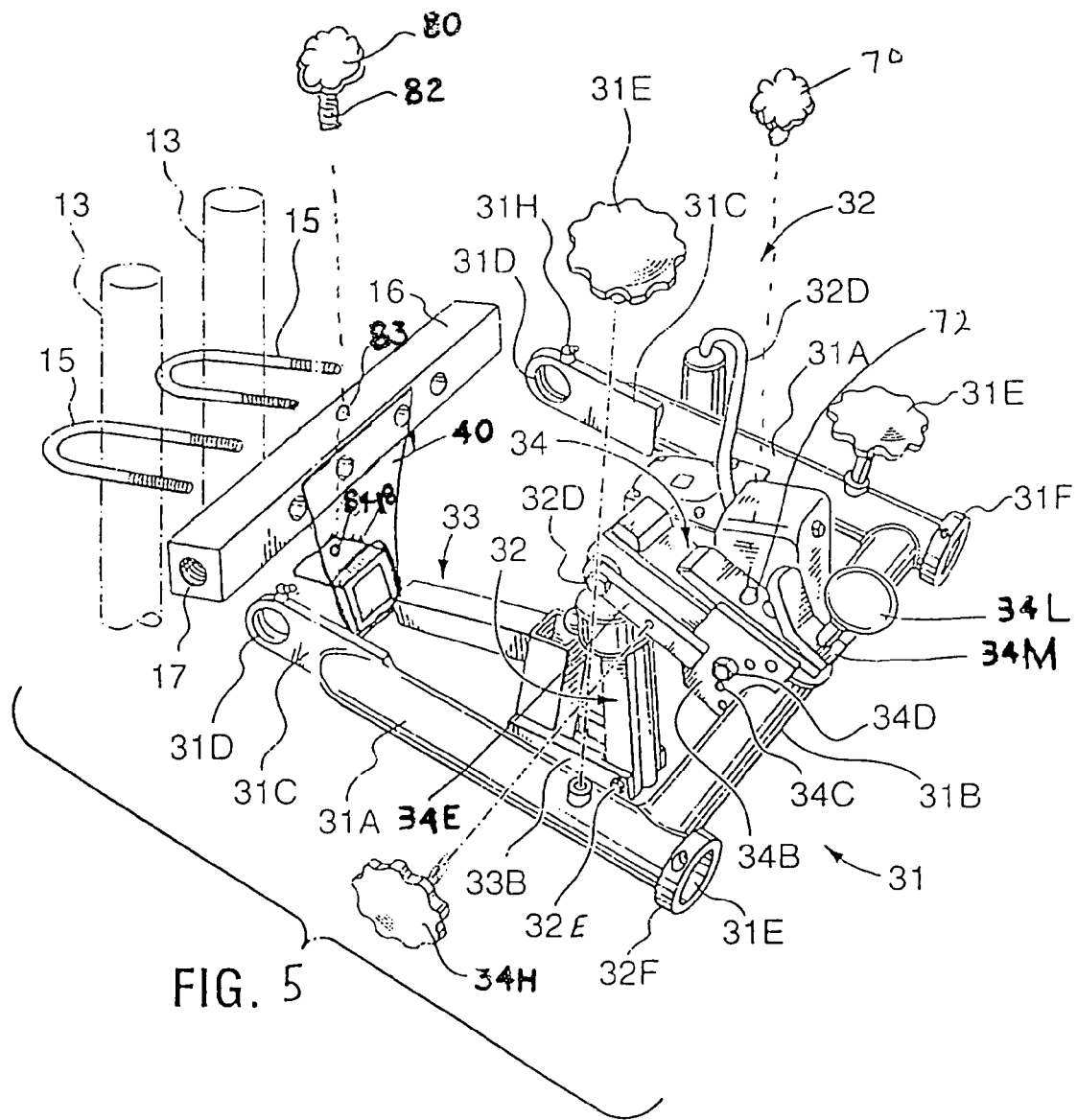
FIG. 5 is an alternate embodiment of the present invention showing an exploded, oblique view of the hitch and lifting assembly and the receiver mounted to the crossbar.

The receiver 18 is a rectangular or square shaped socket attached to a horizontal or vertical lower frame member of the ATV and conventionally is used for trailer couplings. Alternately, a receiver plate 40 as shown in FIG. 5 connecting to and extending upward perpendicular to the receiver 18 having means for attachment such as holes therein can be attached to the crossbar member 16 by aligning the holes therein and inserting bolts there through. It is contemplated that the receiver 18 and corresponding sized and shaped coupling 33 can be any selected size and shape, and that the receiver 18 could be connected to the hitch and lift assembly 30 and the coupler could be connected to the frame of the ATV. In the preferred embodiment, the receiver 18 is located on the vehicle at an elevation thereon lower than where the crossbar member 16 is located on the grill. The receiver 18 and the bolts 19 cooperatively engaging the two threaded holes 17 in the distal end crossbar provide a three point connection of the hitch 30 to the vehicle 10.

As shown in FIG. 5, the crossbar member 16 includes as an option one or more vertical holes 83 there through. The receiver 18 includes one or more holes through the top surface. A knob 80 having a stud 82 extending therefrom can be disposed through a hole 83 in the crossbar member 16 so that the stud extends downward through a threaded hole 84 in the receiver 18 for cooperative engagement with the coupler 33 to secure the coupler in fixed position to reduce play and increase structural support and rigidity of the hitch and lift assembly.

The rigid U-shaped frame 31 comprises a pair of spaced apart parallel elongate tubular members 31A interconnected adjacent one end thereof by a cross member 31B, and having the distal ends 42 crimped substantially flat forming a lug 31C at the distal ends having a through hole 31D align able with the horizontally disposed longitudinal crossbar member 16. The distal ends 44 of tubular members 31A remain open providing cylindrical sockets 31E for receiving respective pair of pins 21 or short support members secured to and projecting from the implement such as a blade 20. The blade 20 or other implement of the preferred embodiment uses pins 21 having horizontal holes there through for mounting in alignment with holes disposed within a pair of mounting brackets 46 formed by aligning spaced apart flanges 48 connected to the back of the blade 20. The pins 21 may be rigidly connected to the mounting brackets 46, or pivotally connected thereto by bolts cooperatively engaging the flanges 48 and pins 21. In the preferred embodiment, the tubular member 31A is reinforced by an annular collar 31F. Each pin 21 has an annular groove 22 that cooperates with a knob and screw 31G threaded into a threaded fitting insert 50 formed in one or more selected positions along the top of the tubular member 31A to lock the implement to the hitch and lift assembly 30. The groove 22 and threaded knob are in alignment when the pin 21 is fully inserted into the cylindrical socket 31E.

It is readily apparent the blade 20 implement can be quickly connected and disconnected respectively simply by hand tightening or loosening, as the case maybe, the two knobs with screws 31G. This makes it easy to switch from one vehicle function to another or from one implement to another and all that is necessary is that the various implements have two parallel pins 21 secured thereto corresponding in size and spacing to the two sockets 31E provided by the tubular members 31A. Obviously locking pins or other means of holding in aligned notches or holes can be substituted for the knob and screw implement lock 31G.

Figure 3:
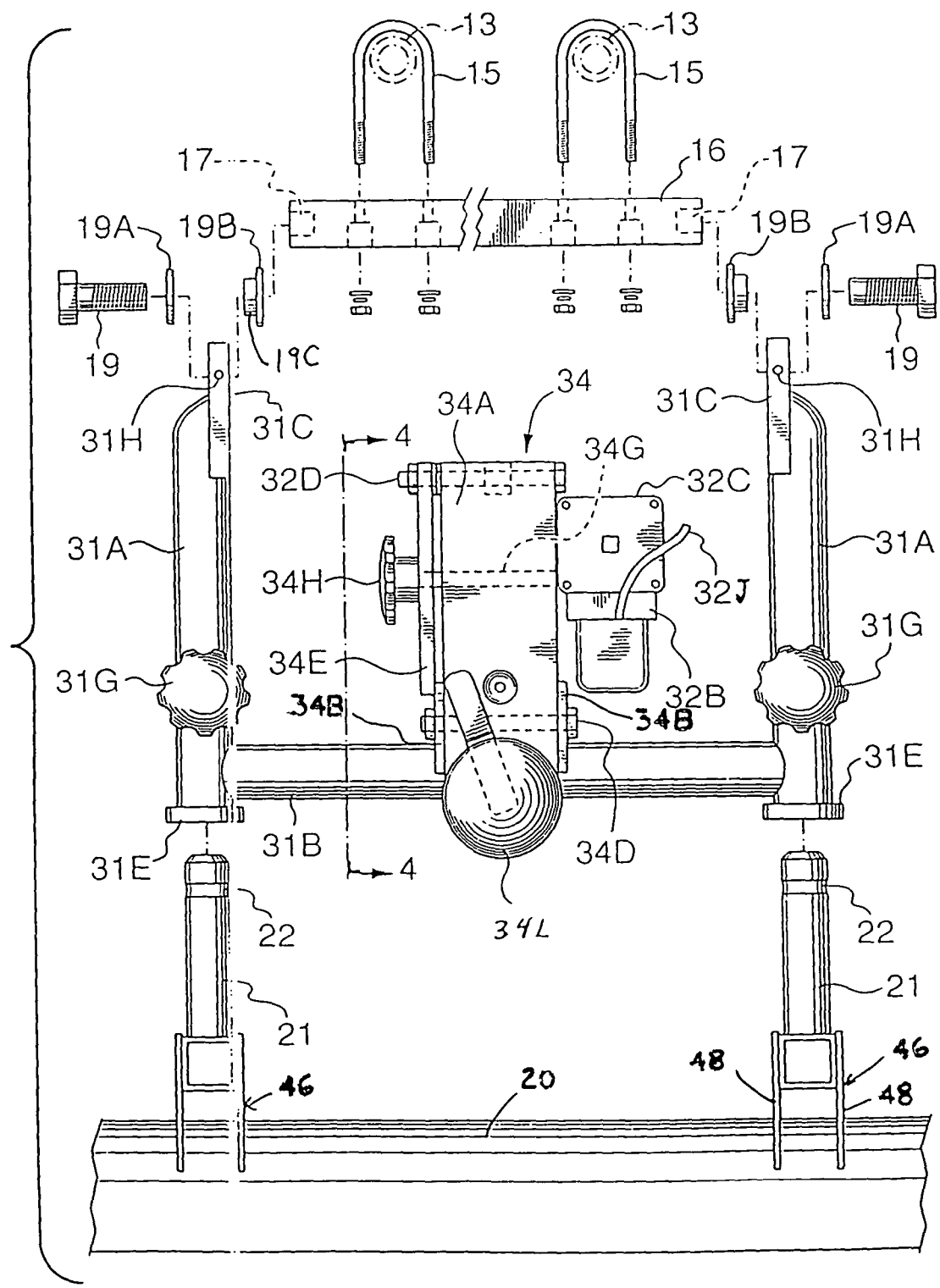
FIG. 3 is an exploded top plan of the hitch and lifting assembly.
Figure 4:
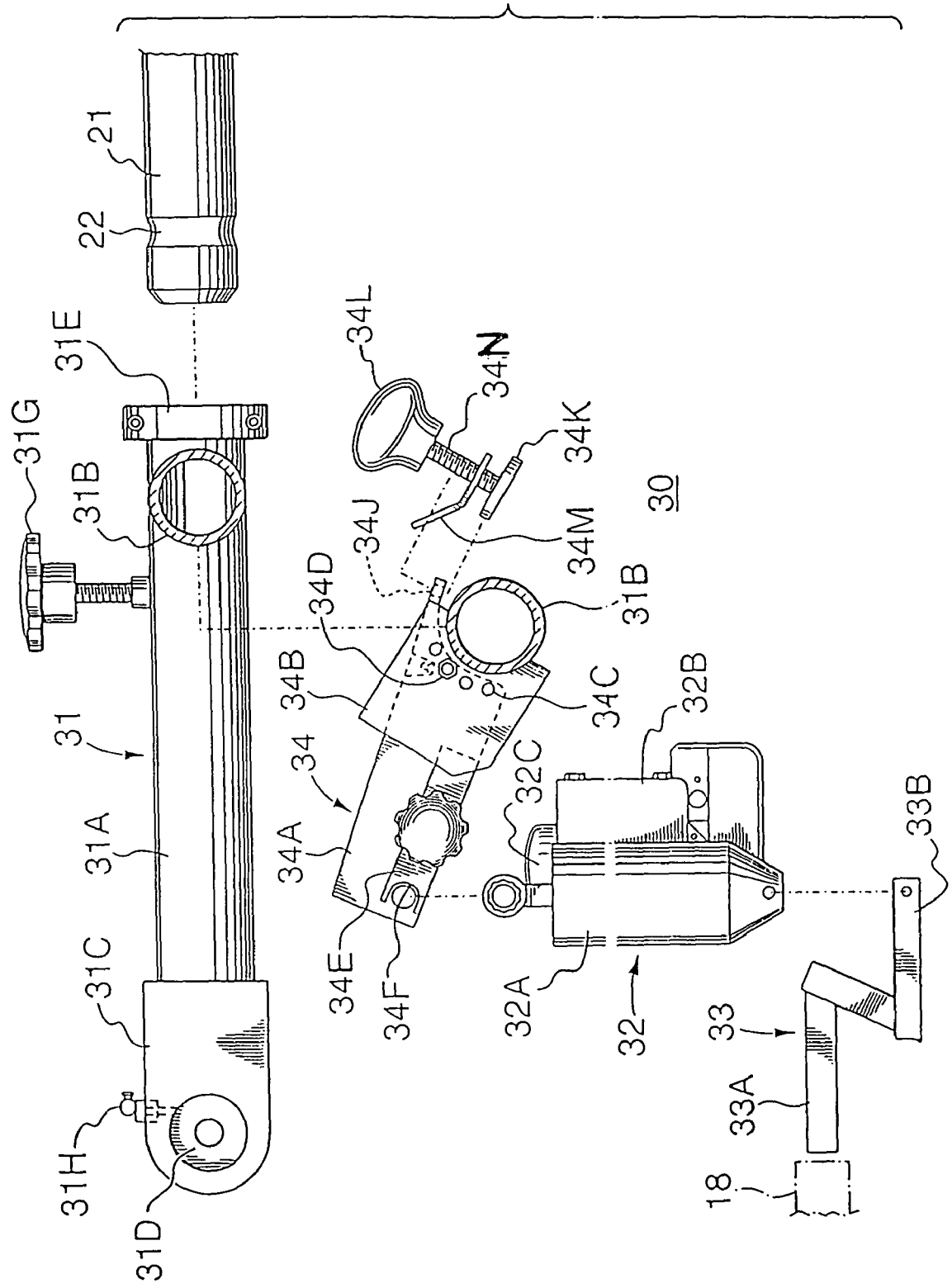
FIG. 4 is an exploded view of the hitch and lifting assembly taken essentially along line 4-4 of FIG. 3.

As best shown in FIG. 3, the longitudinal tubular members 31A are pivotally attached to the crossbar member 16 by respective ones of a pair of threaded mounting bolts 19 on which there is an outer thrust bushing 19A and an inboard support bushing 19B. The support bushing 19B has a sleeve portion 19C that slip fits into the hole 31D in the lug 31C and it is lubricated via grease fitting 31H.

The coupler 33 is Z-shaped having a first generally horizontal short distal end member 33A corresponding in cross-sectional outline shape to the socket of the receiver 18 for slip fit therein. A generally vertical center section member 33H is rigidly attached to the distal end member 33A and extends downwardly a selected distance and is pivotally connected to a second distal end member 33B. The opposing end of the second distal end member 33B is a U-shaped portion for pivotally receiving a lower end connecting mount of a hydraulic cylinder 32A of the hydraulic jack unit 32. The hydraulic jack 32 of the preferred embodiment is electric; however, it is contemplated that pressured fluid or air from a hydrostatic system or pump, respectively, could be used to actuate the hydraulic jack. Moreover, it is contemplated that a rack and pinion assembly can be substituted for or used with the hydraulic jack, although it is less efficient and more bulky. A pin 32E connects the cylinder 32A to the opposing end of the second distal end member 33B of the coupler 33 by alignment and cooperative engagement of holes formed within the distal end member 33B and cylinder 32A. The distal end of the piston rod of the hydraulic jack unit 32 includes a connecting yoke having a hole there through for pivotally connecting to the corresponding aligned yoke holes of the adjusting mechanism unit 34 by a pin 32D.

The unit 32 includes the above mentioned hydraulic cylinder and to power the same there is an electric motor 32B drivingly connected to a hydraulic pump 32C. A control and power cable 32J extends from the motor 32B and connects to a control switch 52 conveniently located on the handle bar in close proximity to the hand grip, and is also connected to the power supply on the vehicle 10.

The adjusting mechanism 34 includes a first coarse adjusting means 54 and a second fine adjusting means 56. The coarse adjusting mechanism 54 includes a floating cam or link 34A pivotally connected at one end by the pin 32D to the distal end or yoke of the piston rod of hydraulic jack unit 32 and the other end of the link 34A projects between a pair of lugs 34B defining projections or mounting plates rigidly anchored to and projecting from the frame cross member 31B. The lugs 34B have a series of holes 34C for selectively adjusting the angle and distance of the piston rod pivotally connecting thereto. A bolt or pin 34D passes through one of the holes and a hole in the link 34A providing a loose connection. With this loose connection there is relative movement between the lugs 34B and the link 34A and such motion is pivotal movement of the respective members about the pin 34D. The pin 34D is lubricated via a grease fitting.

A cam lock arm 34E is notched at one end as indicated at 34F and the other end overlaps one of the lugs 34B. A shaft 34G passes through a hole in the lock arm 34E intermediate the ends thereof and is threaded into a threaded bore in the link 34A. A hand grip knob 34H on the shaft 34G provides means to manually lock and unlock the cam of link 34A by turning the knob to increase or decrease, as the case maybe, the frictional grip of the lock arm 34E on the lug 34B.

Alternately, the knob and stud 34H can be disengaged from the vertical threaded bore of the floating cam link 34A. The cam lock 34E can be removed therefrom. A threaded bore 60 can be formed in the top of the floating cam link 34A whereby the cam lock 34 E can be disposed horizontally across the top edge of the lug 34B and secured thereto with the knob and stud 34H to create a positive lock for creating down pressure for selected applications.

The fine adjusting mechanism 56 comprises a stud 34H threaded into a vertically threaded hole 34J adjacent an end of the link 34A and foot plate 34K on the end of the stud 34H bears against the longitudinal cross member 31B. A hand grip knob 34L provides means to manually turn the stud 34H providing the fine adjustment. A lever 34M threaded on the stud 34H is used to lock the stud 34H in position, by binding against the link 34A, at the desired position.

Figure 6:
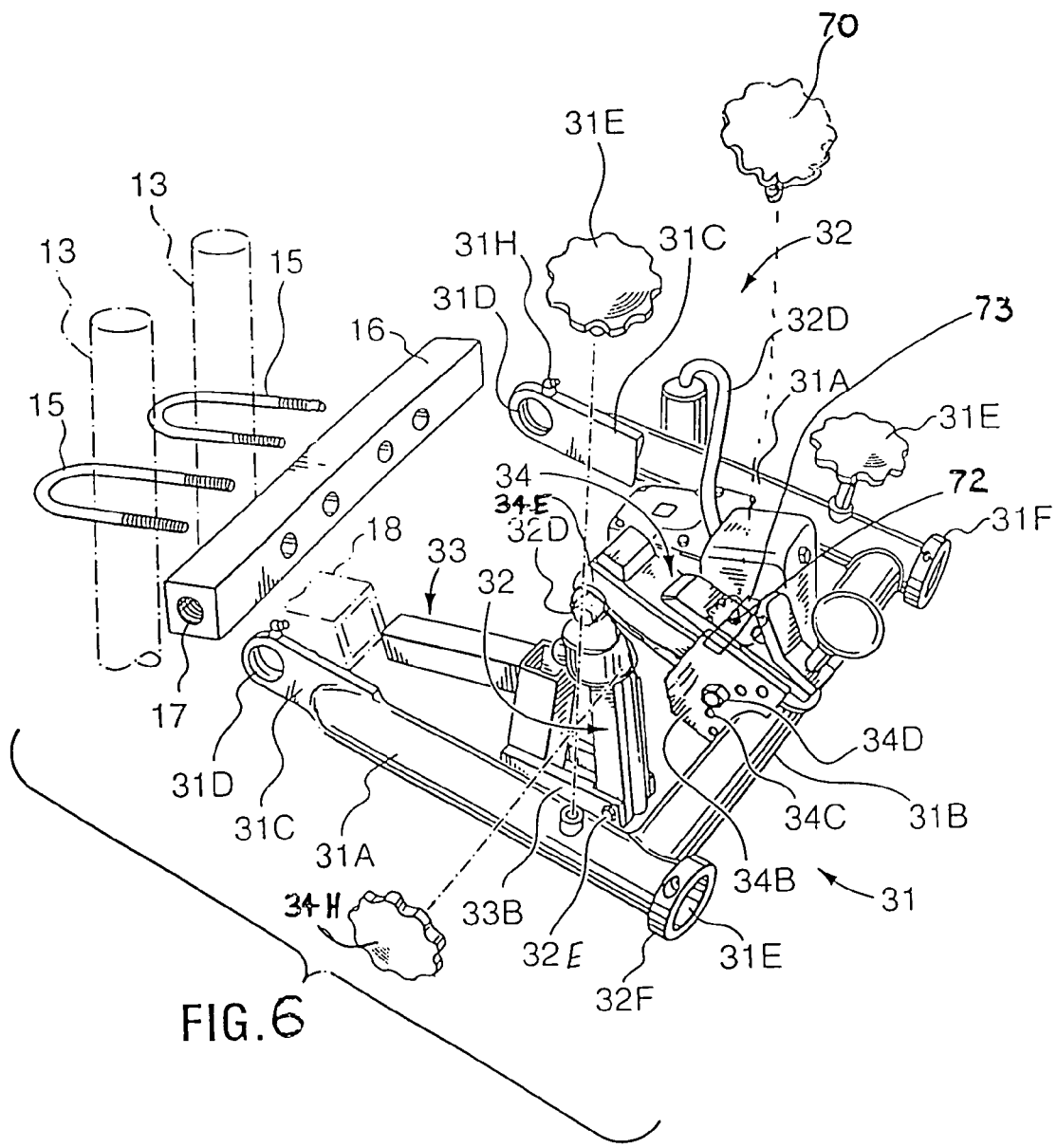
FIG. 6 is an alternate embodiment of the present invention showing an exploded, oblique view of the hitch and lifting assembly and the relocation of the cam lock secured to the top of the cam link and extending over the top edge of the lugs on each side thereof providing means for locking the floating cam and exerting downward pressure via the hydraulic jack.
Figure 7:
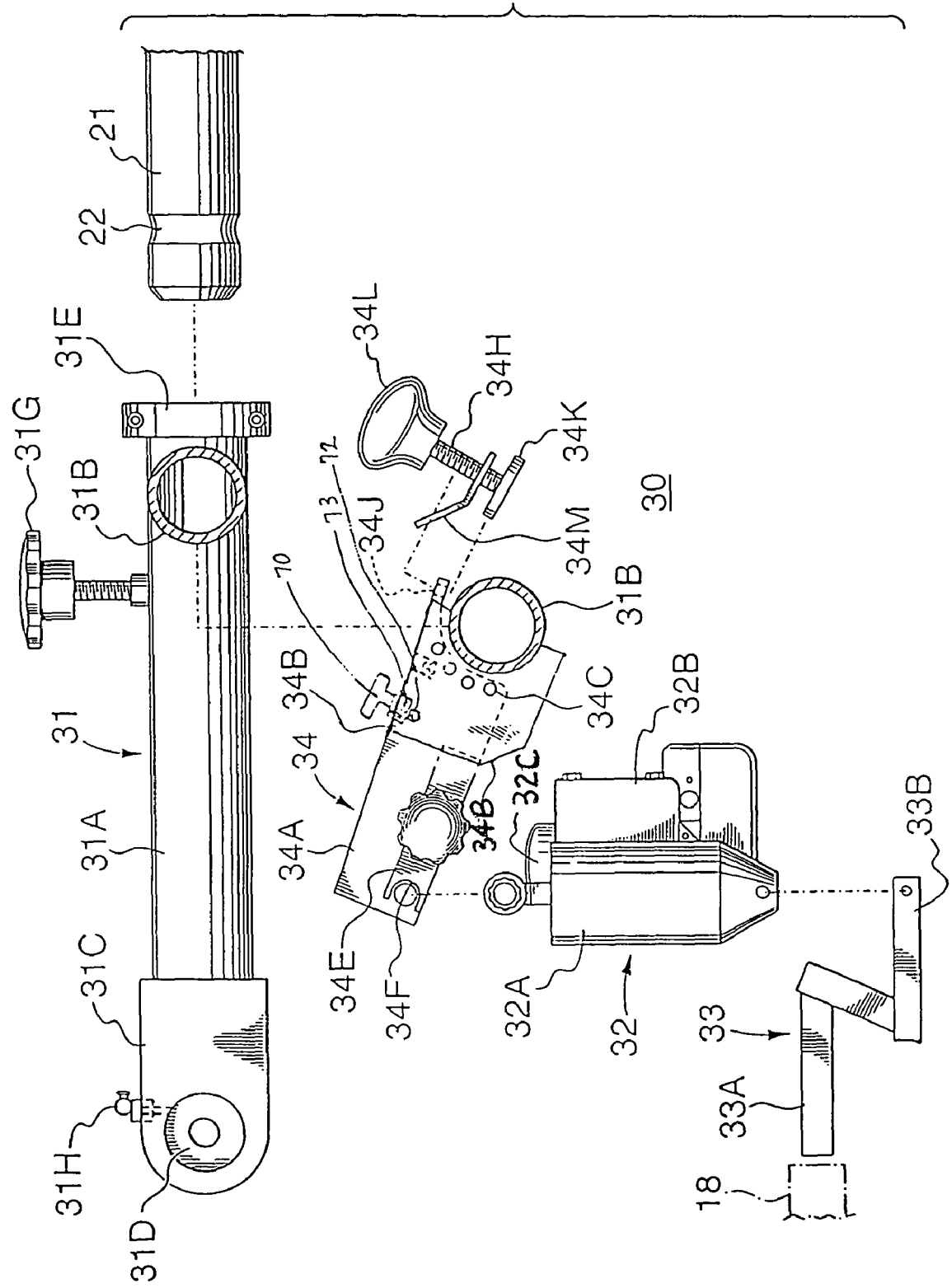
FIG. 7 is an exploded view of the hitch and lifting assembly taken essentially along line 4-4 of FIG. 3, wherein the cam lock is secured to the top of the cam link by a knob and threaded stud including a bracket extending over the top edges of the lugs for locking the floating cam.

FIG. 6 shows the relocation of the cam lock 34E secured to the top of the cam link 34 secured thereto by a knob and threaded stud 70 cooperatively engaging a threaded bore 72 drilled into the top of the cam link 34 and having a bracket 73 extending over the top edges of the lugs 34B on each side thereof providing means for locking the floating cam 34 and for exerting downward pressure via the hydraulic jack unit 32.

Figure 1:
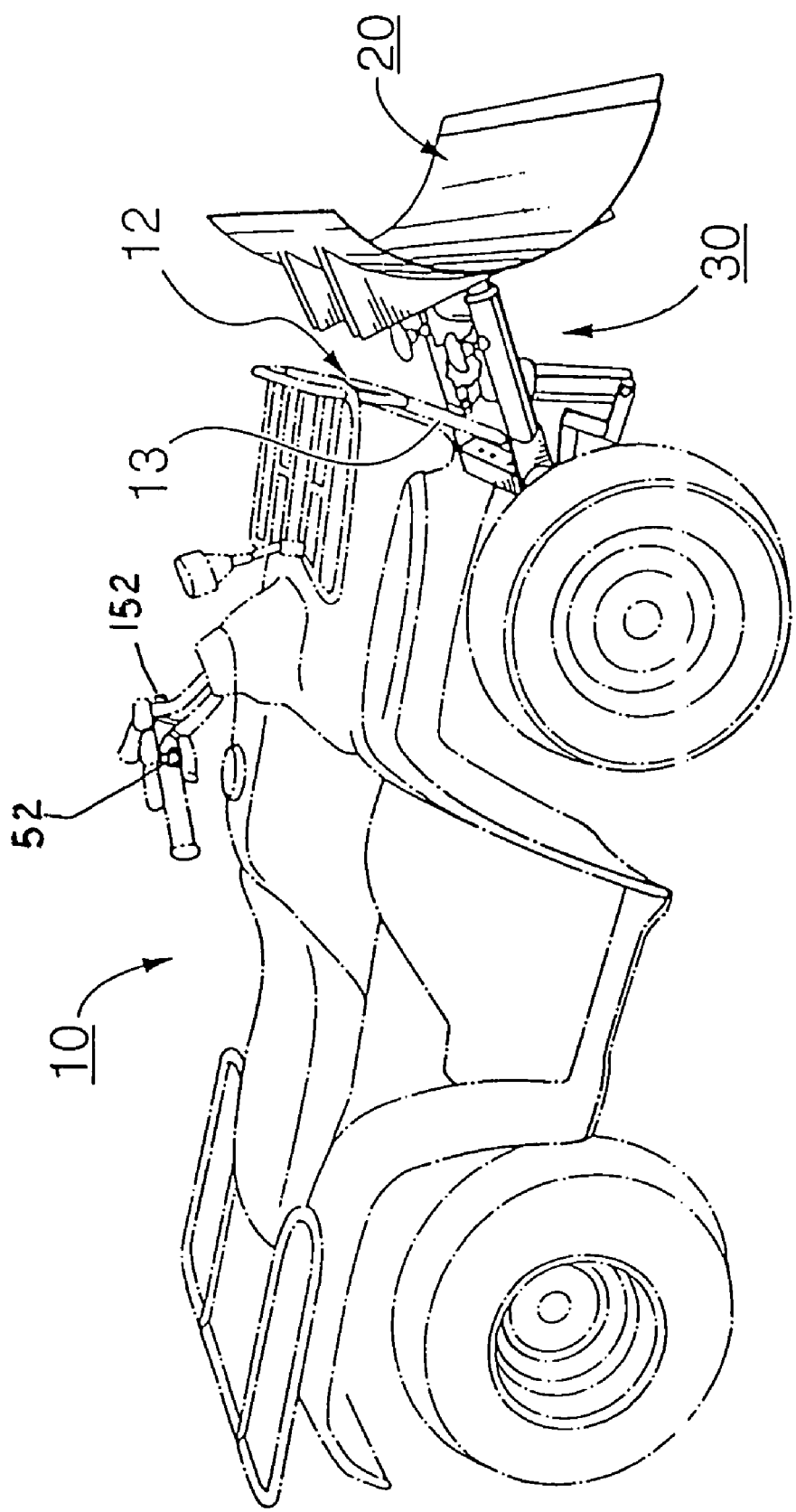
FIG. 1 is a side oblique view of an all terrain vehicle with a blade attached thereto by a hitch and lifting assembly provided in accordance with the present invention.
Figure 8:
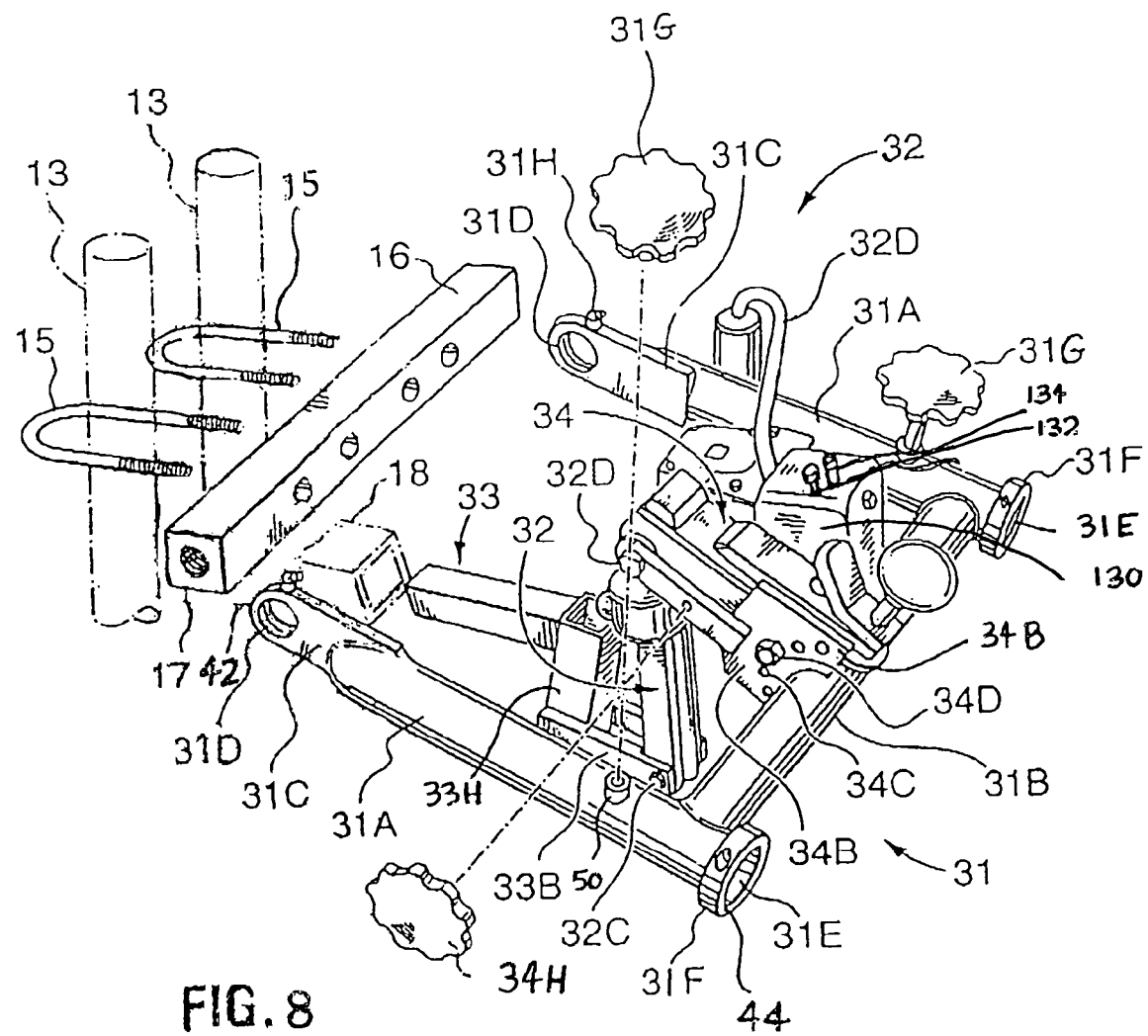
FIG. 8 is an alternate exploded, oblique view of the hitch and lifting assembly shown in FIG. 1 including the hydraulic accessory port connections.
Figure 9:
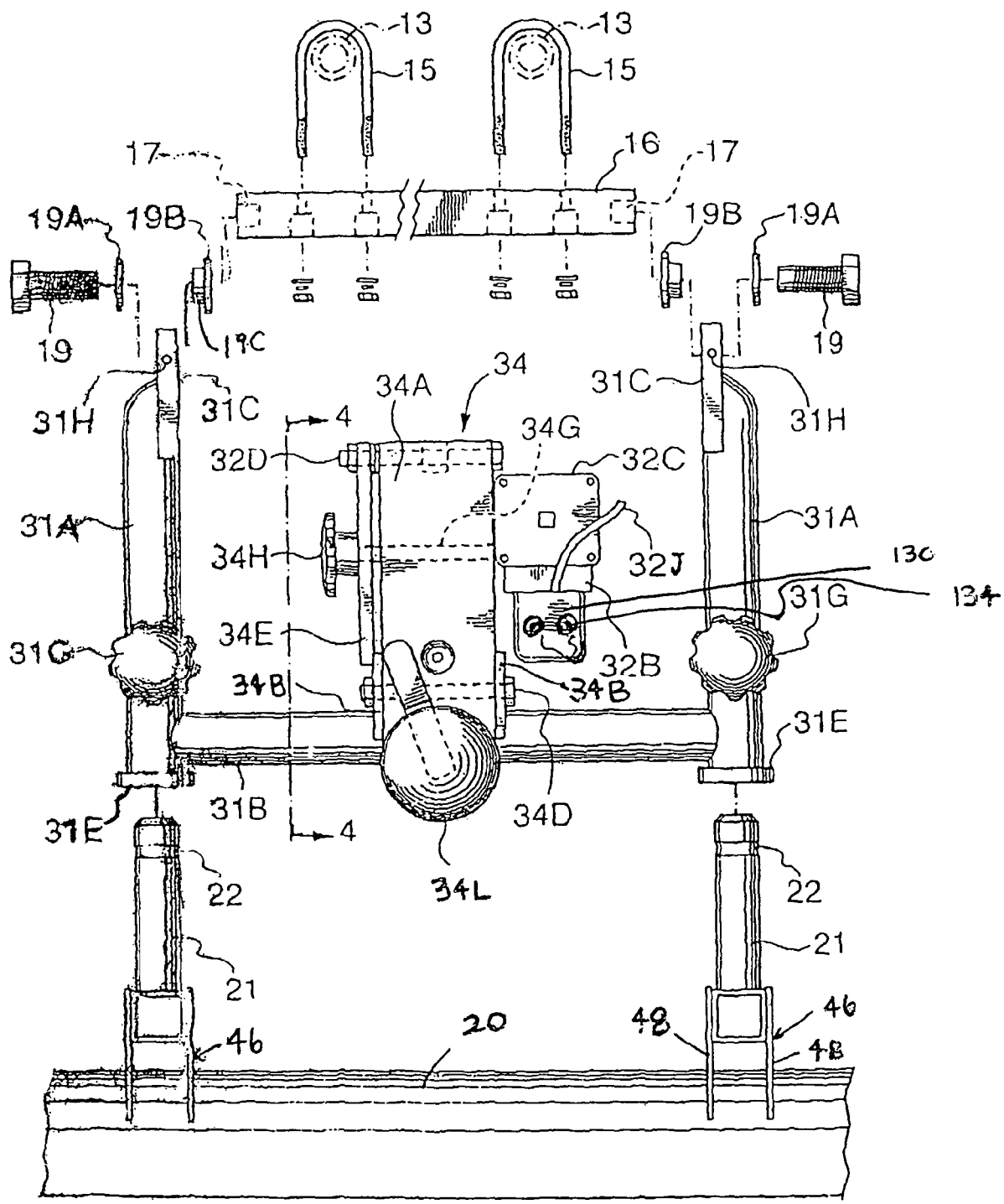
FIG. 9 is an exploded top plan of the hitch and lifting assembly of FIG. 8.
Figure 10:
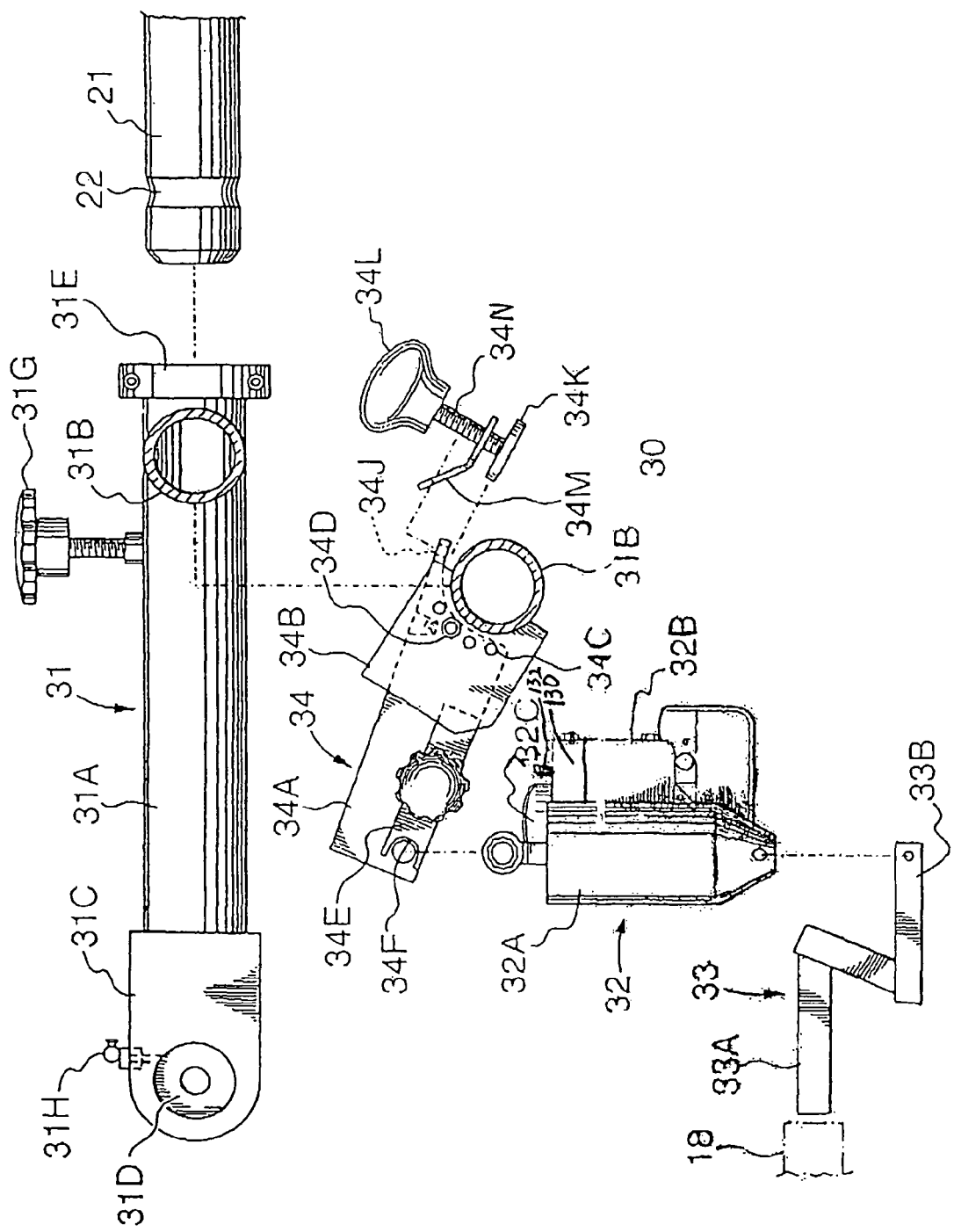
FIG. 10 is an exploded view of the hitch and lifting assembly taken essentially along line 10-10 of FIG. 9.
Figure 11:
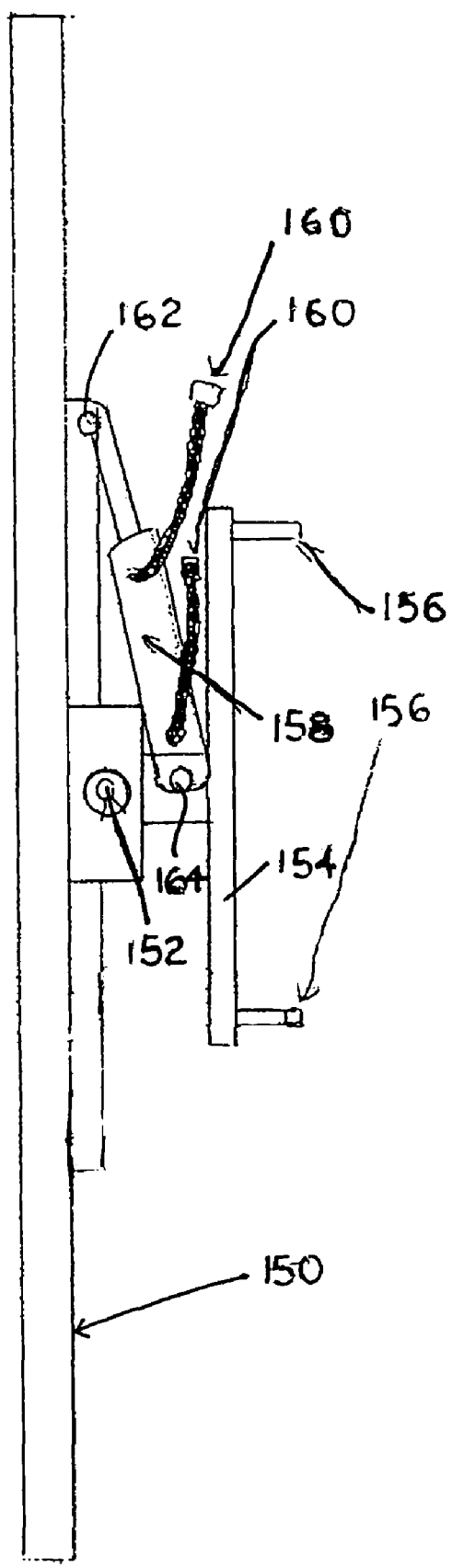
FIG. 11 is a top plan view of a blade embodiment for use with the embodiments of the present invention showing a swivel point, connection pins, and hydraulic cylinder with hose couplers.

As shown in FIGS. 8-10, the embodiment shows a hydraulic diversion valve 130 together with a pair of hydraulic accessory ports 132 with quick connect hydraulic hose couplers 134 located on top of the hydraulic diversion valve 130. One means of activating the hydraulic diversion valves 130 is to engage an electric an electric override switch 152 as shown in FIG. 1. Once the electric override switch is activated, the lift up and down switch 52 stops the lift from moving up and down and then supplies hydraulic pressure t the hydraulic accessory ports 132 from the hydraulic pump 32C. The hydraulic diversion valves 130 are used to operate hydraulic power to a selected attachment such as a blade 150 as shown in FIG. 11 for changing the angle of the blade 150 or other implement such as a rotary sweeper (not shown) to the desired angle of use, or to tilt the blade 150 or other implement such as a dump bucket (not shown), or to adjust the height of a finish mower (not shown). Once the electric override switch 152 is released the handle bar up and down switch 52 stops supplying hydraulic pressure to the hydraulic accessory ports 132 and the hydraulic pressure is once again diverted to the lift cylinder and the lift return to the up and down positioning mechanism. Of course, the up and down switch 52 and switch for the diversion valves 152 can be incorporated into a single switch unit for convenience.

Moreover, an electric hydraulic pump which includes diversion valves built integrally therein can be substituted for the separate electric hydraulic pump 32C of the present invention and diversion valve 130 combination.

The hitch and lift assembly of the present invention can be utilized with any type of vehicle as a coupling hitch include snow blowers, rotary tilling devices, rotary brushes, seeders, front end mounted trenchers, yard excavators, push blade, box scrapers, reel lawn mower, rotary lawn motor, saw bush cutting systems and boom mowers, post drivers, posthole augers, drawbars with specialty hitch attachments, vacuum systems, fork lifts, platforms, and the like.

For example, the blade 150 shown in FIG. 11, includes a swivel point utilizing a simple pin and hinge assembly 152, a blade cross member 154 including coupling pins 156 extending therefrom, at least one hydraulic cylinder 158 attached to a blade pivot point 162 and a blade cross member pivot point 164, and quick connect hydraulic hose couplers 160.

Although it is possible to utilize such the present device in place of a hydraulic unit of a tractor or the like, the advantages exhibited by the instant invention are better realized when utilized on the front end of a vehicle utilizing the electric hydraulic jack providing a compact, quick disconnect lifting device independently of high pressure hydraulic fluid systems.

Figure 12:
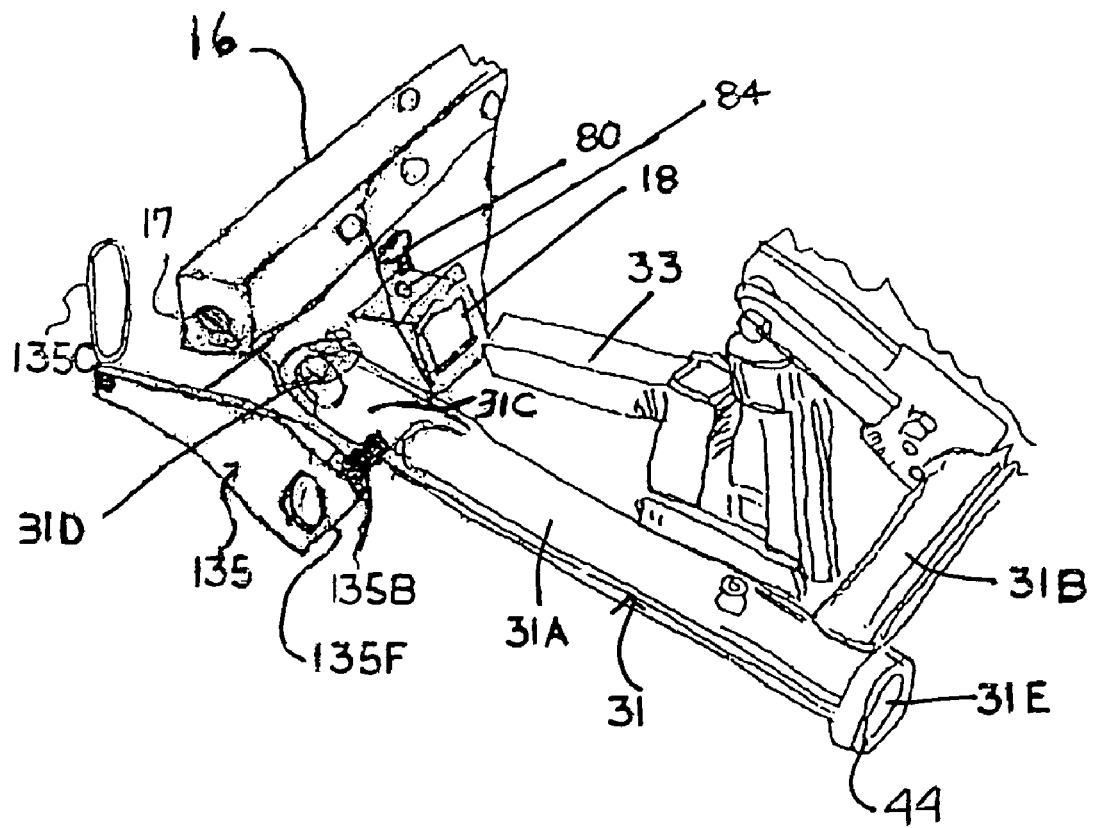
FIG. 12 is a perspective view of a portion of the present invention including a variable suspension support arm adapter for connecting to the upper arm or strut of an alternate vehicle with end hooks to connect to a support arm of the vehicle.

FIG. 12 illustrates a variable suspension support arm adapter for connecting to the upper arm or strut of an alternate vehicle with end hooks to connect to a support arm of the vehicle such as an ATV. The rigid U-shaped frame 31 comprises a pair of spaced apart parallel elongate tubular members 31A interconnected adjacent one end thereof by a cross member 31B, and having the distal ends 42 crimped substantially flat forming a lug 31C at the distal ends having a through hole 31D align able with the horizontally disposed longitudinal crossbar member 16. The distal ends 44 of tubular members 31A remain open providing cylindrical sockets 31E for receiving respective pair of pins or short support members secured to and projecting from the implement such as a blade. The embodiment shown in FIG. 12 includes a variable suspension support arm 135 including a ride height adjustment bolt 135B which projects over the top of the lug 31C. A loop 135C hooks into the area of the upper ball joint or strut of the ATV frame and forms a link that connects to the upper arm or strut of a vehicle such as an ATV, whereby the other end hooks to the support arm 135. A pin or bolt 17 extending through the support arm 135 and into a hole 31D is rotatably engageable with the distal end of crossbar member 16 forming a swiveling arm assembly. When the lift is in the process of raising an object upward such as a blade 150, the ride height adjustment bolt 135B of the variable suspension support arm 135 makes contact on top of the lug 31C, thus pushing the portion of the support arm 135 extending to the ATV frame downward and the portion of the support arm 135F projecting toward the lift assembly downward transferring the load weight to the loop 135C to the upper A-frame arm or strut of the vehicle. This transfer the load or weight to the hub wheel putting the weight onto the wheel area of the vehicle and also takes the load off of the vehicle frame or chassis. Thus when the support arm 135 is pulled by the load being lifted, the weight is transferred from the frame or chassis to the load bearing wheels of the vehicle. Therefore the support arms 135B are used to adjust the desired ride height of the object being supported above the ground when the lift is raised up all the way and when the lift is in the downward position the variable suspension support arm 135 is deactivated because when the lift is in the downward position the lift goes down and floats. Furthermore, the loop 135C provides a spring means for aiding the suspension when hauling heavy loads. The variable suspension support arm is only necessary for handling heavy loads.

Figure 13:
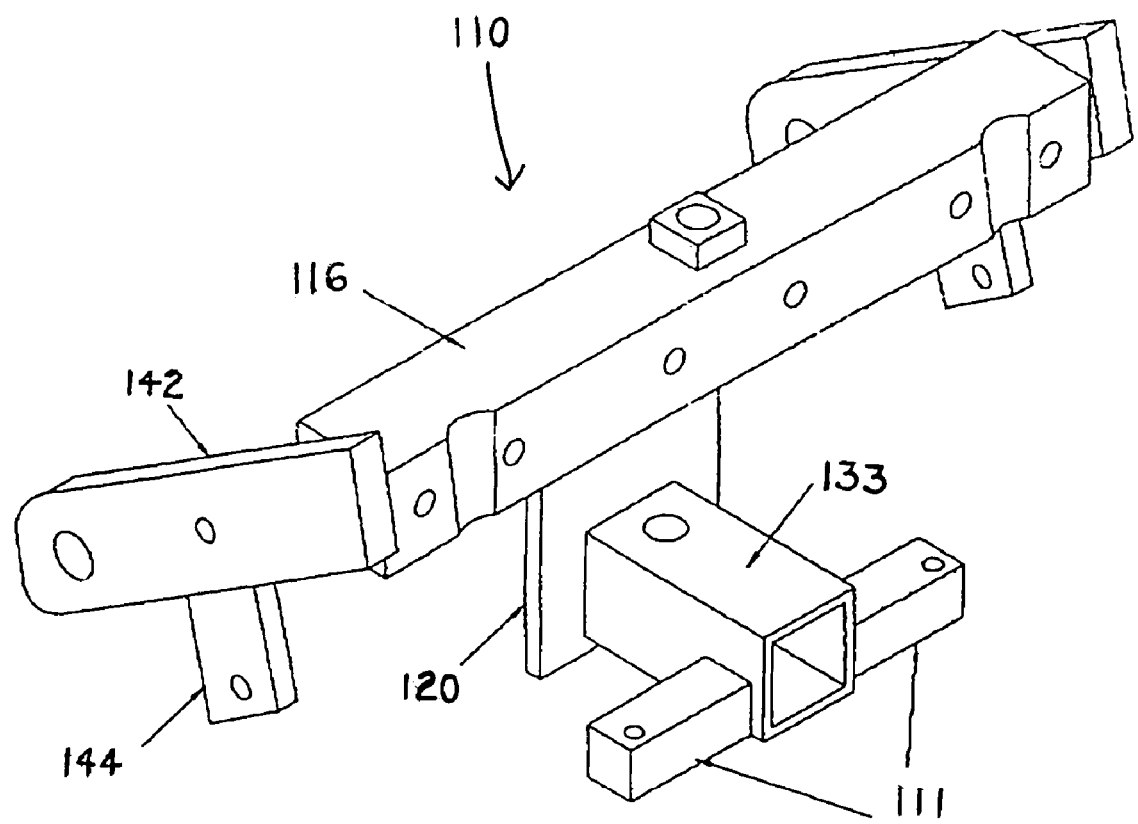
FIG. 13 is a perspective view of a portion of the present invention including an alternate embodiment of a lift mounting bar adapter for connecting the present invention to a frame of another vehicle.

FIG. 13 is a perspective view of a portion of the present invention including an alternate embodiment of a lift mounting bar adapter 110 for connecting the present invention to a frame of another vehicle showing the mounting plate 120, crossbar member 116, coupler 133, attachment arms 111, support arms 142, and support member 144.

Figure 14:
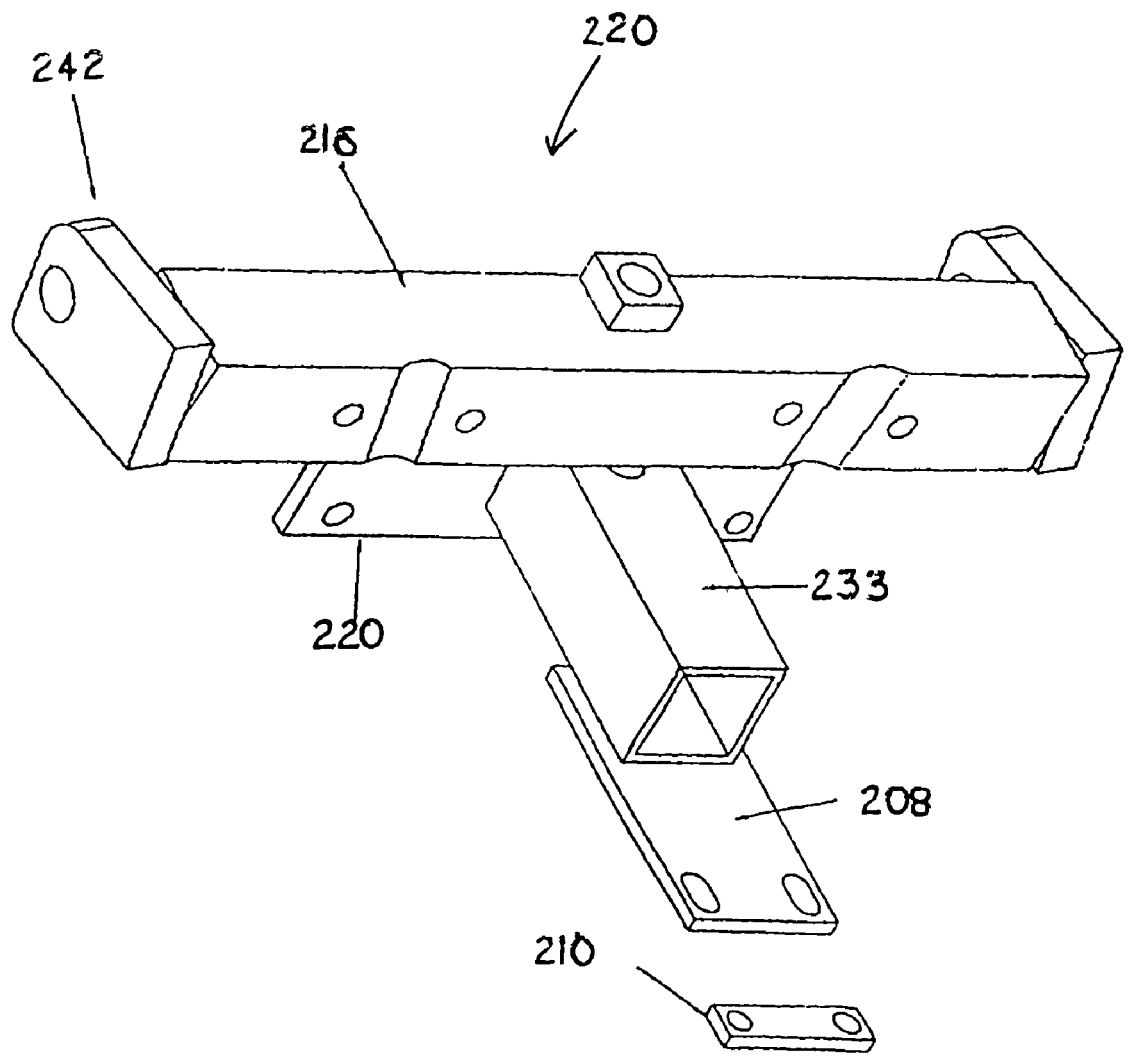
FIG. 14 is a perspective view of a portion of the present invention including an alternate embodiment of a lift mounting bar adapter for connecting the present invention to a frame of another vehicle.

FIG. 14 is a perspective view of a portion of the present invention including an alternate embodiment of a lift mounting bar adapter 220 for connecting the present invention to a frame of another vehicle showing the mounting plate 220, crossbar member 216, coupler 233, coupler support plate 208, locking bar 210, and support arms 242.

Figure 15:
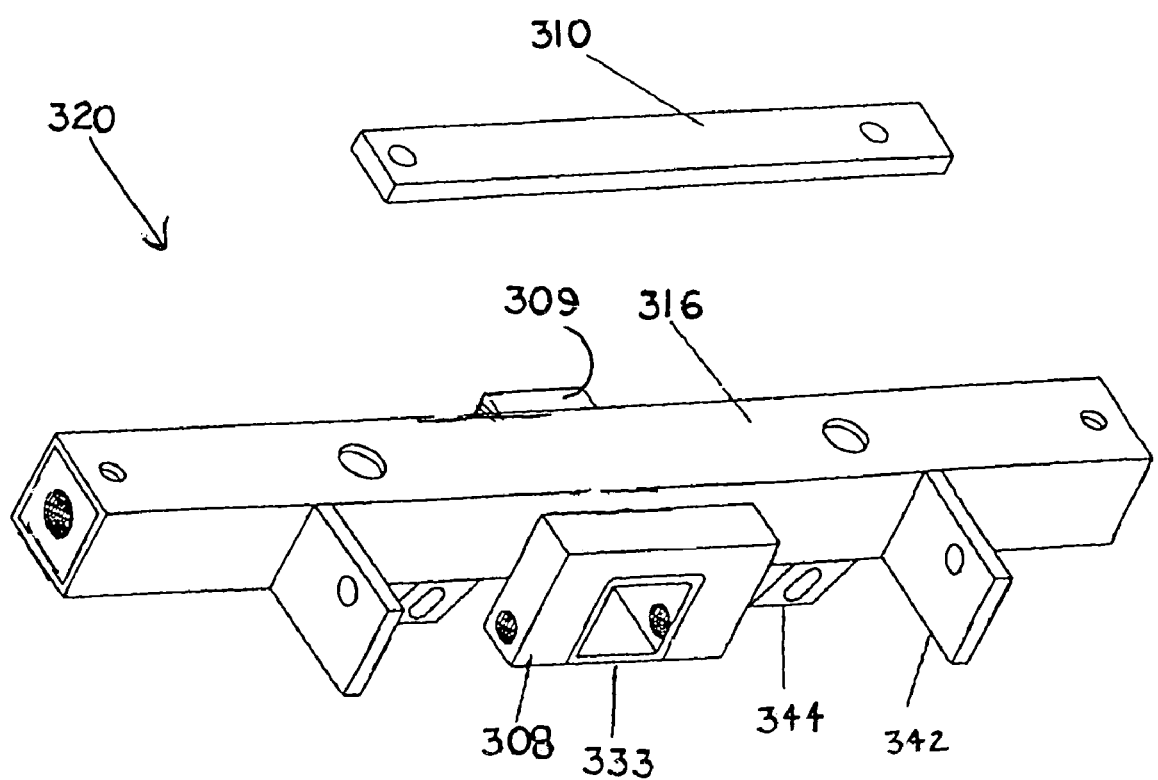
FIG. 15 is a perspective view of a portion of the present invention including an alternate embodiment of a lift mounting bar adapter for connecting the present invention to a frame of another vehicle.

FIG. 15 is a perspective view of a portion of the present invention including an alternate embodiment of a lift mounting bar adapter 320 for connecting the present invention to a frame of another vehicle showing crossbar member 316, coupler 333, coupler support block 208, coupler support block 209, locking bar 310, support arms 342, and support tabs 344.

Figure 16:
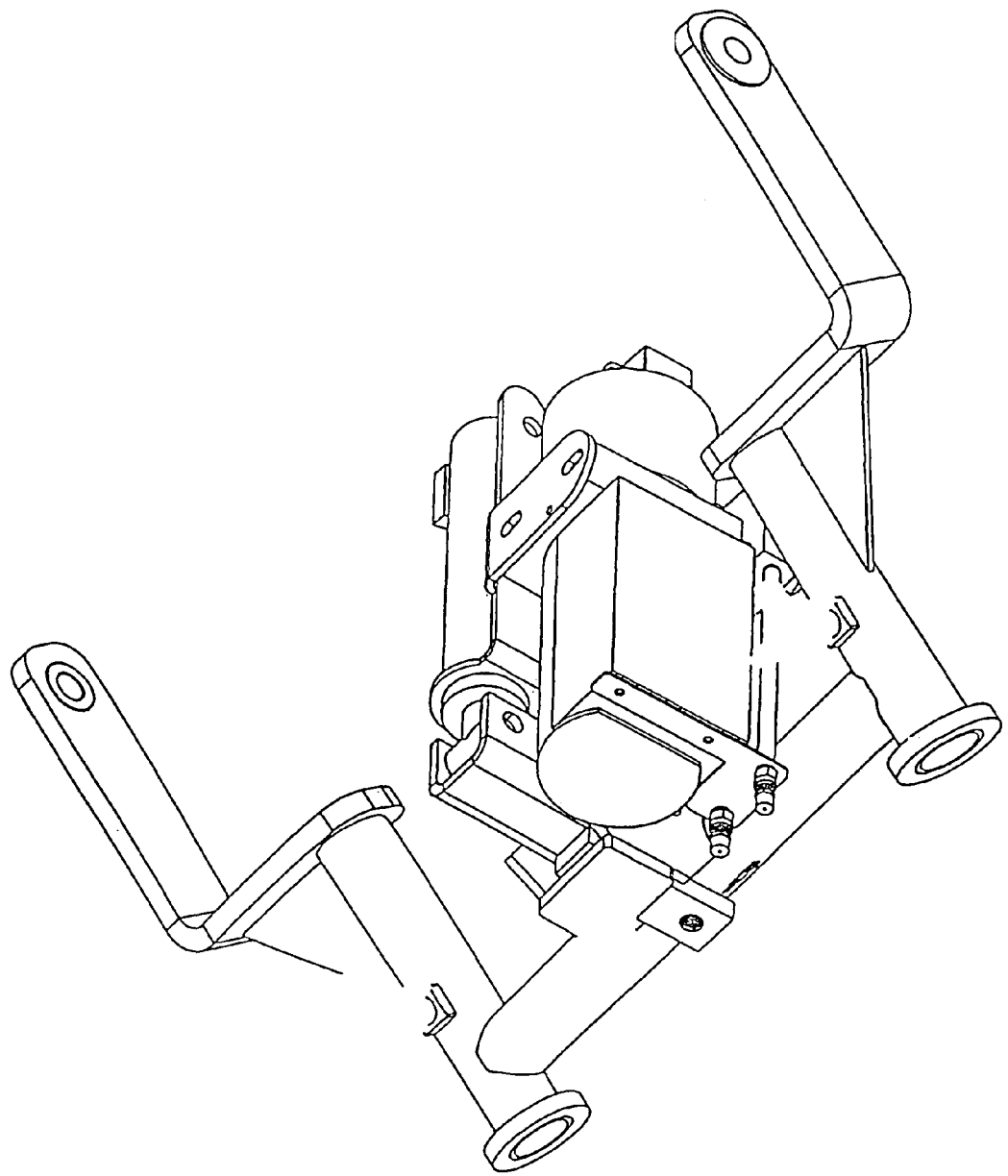
FIG. 16 is a perspective view of a portion of the present invention showing an alternate embodiment of a coupler connecting one end of the hydraulic jack unit to a receiver on the ATV and an adjusting mechanism that connects the other end of the hydraulic jack unit to the frame.
Figure 17:
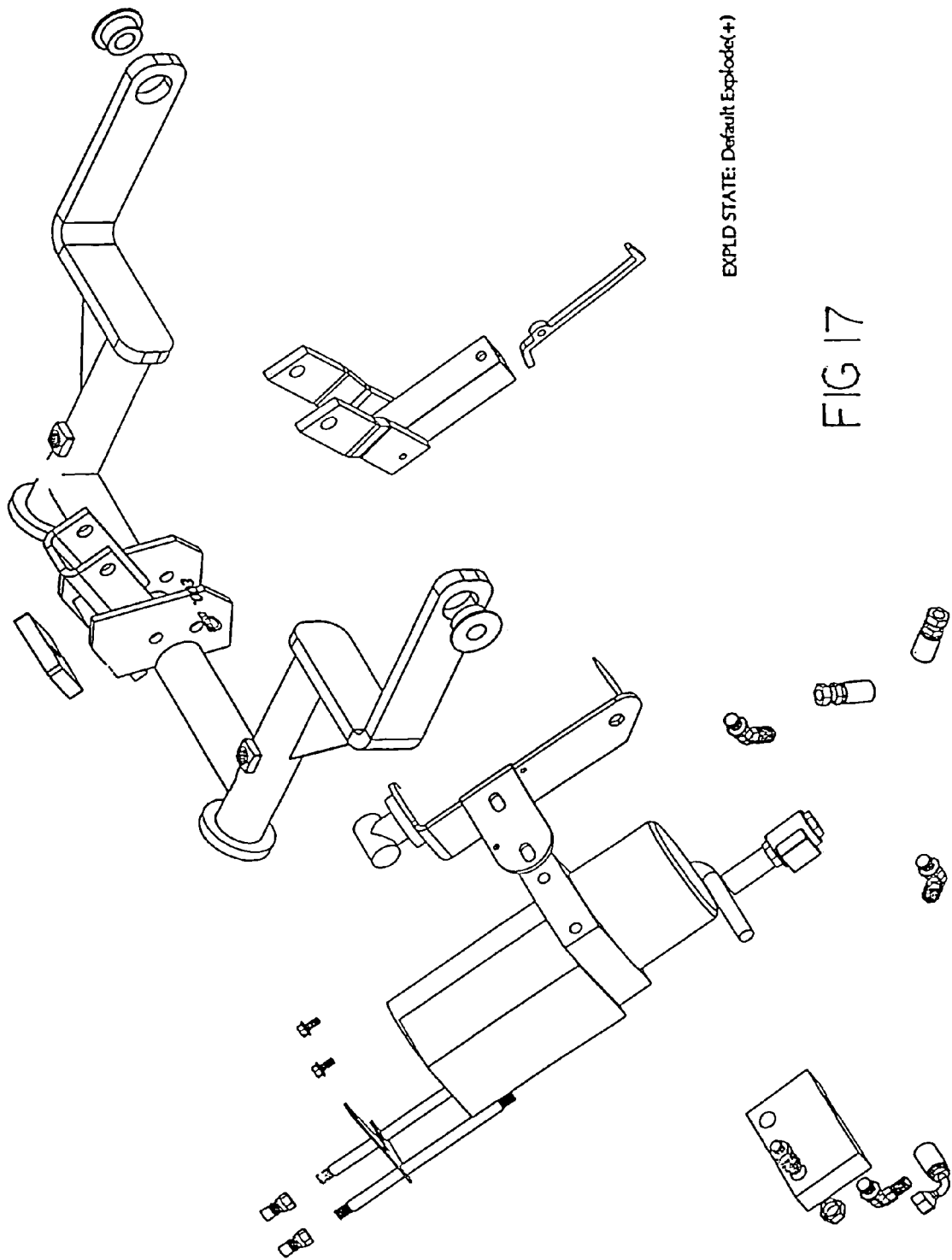
FIG. 17 is an exploded perspective view of the embodiment of FIG. 16.
Figure 18:
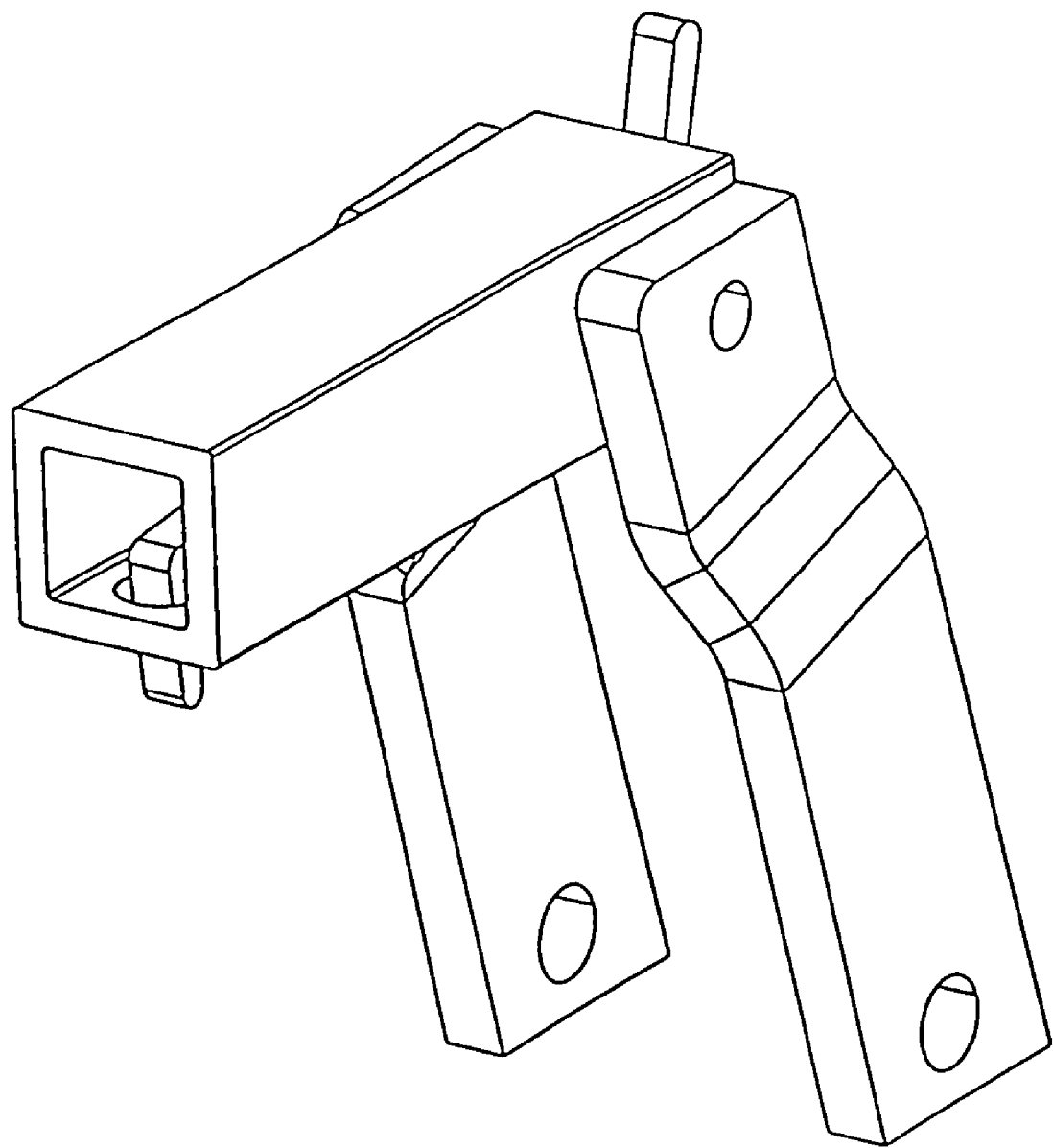
FIG. 18 is a perspective view of the coupler of FIGS. 16 and 17.

FIG. 16 is a perspective view of a portion of the present invention showing an alternate embodiment of a coupler connecting one end of the hydraulic jack unit to a receiver on the ATV and an adjusting mechanism that connects the other end of the hydraulic jack unit to the frame;

FIG. 17 is an exploded perspective view of the embodiment of FIG. 16;

FIG. 18 is a perspective view of the coupler of FIGS. 16 and 17; and

FIG. 19 is a perspective view of an alternate embodiment of a frame the present invention for mounting onto the ATV.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A hitch for attaching an implement to a motorized vehicle comprising:
   a) a rigid generally U-shaped frame comprising pair of a legs connecting to a cross member thereinbetween, a pair of spaced apart sockets on said frame at a location remote from a free outer end of each one of said legs of said U-shaped frame, said free outer end of each leg being pivotally attachable to the motorized vehicle,
   b) a rigid link selectively adjustably connected to free outer end of each of said legs of said U-shaped frame, and means limiting arcuate movement of said U-shaped frame;
   c) an extendable and retractable power driven jack including an electric motor and a hydraulic pump with at least one hydraulic diversion valve; and
   d) said extendable and retractable power driven jack unit is disposed within said U-shaped frame and connecting at one end to said link and means for connecting the other end to the motorized vehicle.

2. A hitch as defined in claim 1 wherein the sockets are elongate, axially parallel sockets.

3. The hitch as defined in claim 2 wherein a distal end of said legs of the U-shaped frame project beyond said U-shaped frame and wherein the sockets are located in such projecting portion.

4. The hitch as defined in claim 1 wherein the u-shaped frame comprises a pair of parallel conduits open at one end thereof and a cross member interconnecting said conduits adjacent said open ends, said open ends providing said sockets.

5. The hitch as defined in claim 4 wherein the ends of the conduits opposite said open ends have an apertured lug for pivotal attachment to the motorized vehicle.

6. The hitch as defined in claim 1 wherein said rigid link is connected to a lug projecting said rigid frame by a pivot pin and wherein said lug has a series of spaced apart apertures for receiving said pin and thereby being selectively adjustably connectable.

7. The hitch as defined in claim 6 wherein there are a pair of said lugs spaced apart from one another and wherein said link projects between said lugs.

8. The hitch as defined in claim 1 wherein said means limiting said arcuate movement is adjustable to vary the length of arcuate movement.

9. The hitch as defined in claim 1 wherein said means connecting the jack unit to the motorized vehicle comprises a coupler.

10. The hitch as defined in claim 9 wherein said coupler is Z-shaped.

11. The hitch as defined in claim 9 wherein said coupler has a shaft insertable into a socket receiver therefor on the vehicle.

* * * * *